(12) United States Patent
Hintennach et al.

(10) Patent No.: US 12,330,482 B2
(45) Date of Patent: Jun. 17, 2025

(54) WINDING ASSEMBLY AND METHOD FOR PRODUCING SUCH A WINDING ASSEMBLY

(71) Applicant: BOS GmbH & Co. KG, Ostfildern (DE)

(72) Inventors: Markus Hintennach, Uhingen (DE); Carolin Günther, Reutlingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 469 days.

(21) Appl. No.: 17/709,891

(22) Filed: Mar. 31, 2022

(65) Prior Publication Data
US 2022/0324301 A1 Oct. 13, 2022

(30) Foreign Application Priority Data
Apr. 9, 2021 (DE) .......................... 102021203516.7

(51) Int. Cl.
*B60J 1/20* (2006.01)
*B32B 5/02* (2006.01)
(Continued)

(52) U.S. Cl.
CPC .............. *B60J 1/2066* (2013.01); *B32B 5/026* (2013.01); *B32B 37/12* (2013.01); *B32B 37/20* (2013.01); *B32B 38/0004* (2013.01); *B32B 38/0008* (2013.01); *B65H 75/44* (2013.01); *B32B 2310/0831* (2013.01); *B32B 2571/00* (2013.01); *B32B 2605/00* (2013.01)

(58) Field of Classification Search
None
See application file for complete search history.

(56) References Cited

U.S. PATENT DOCUMENTS

| 8,197,911 B2* | 6/2012 | Templeman | C08F 2/46 427/508 |
| 2002/0033244 A1* | 3/2002 | Schlecht | B60J 1/208 160/370.22 |

(Continued)

FOREIGN PATENT DOCUMENTS

| CN | 204782678 U | 11/2015 |
| DE | 10204331 A1 | 8/2003 |

(Continued)

OTHER PUBLICATIONS

Chinese Office Action issued in corresponding Chinese Application No. 202210366759.6 dated Apr. 30, 2024 (8 pages).

(Continued)

*Primary Examiner* — Michael N Orlando
*Assistant Examiner* — Abhishek A Patwardhan
(74) *Attorney, Agent, or Firm* — FLYNN THIEL, P.C.

(57) ABSTRACT

A winding assembly for a protective device of a motor vehicle, and a method for producing such a winding assembly. Such a winding assembly includes a form-stable winding shaft and a flexible winding web held on the winding shaft such that it can be wound up and unwound. The winding shaft is formed by a form-stabilized wound-up first portion of a flexible sheet-form material and the flexible winding web is formed by a second portion of the flexible sheet-form material adjoining the first portion, whereby the winding shaft and the winding web are in continuous one-piece form.

13 Claims, 5 Drawing Sheets

(51) Int. Cl.
*B32B 37/12* (2006.01)
*B32B 37/20* (2006.01)
*B32B 38/00* (2006.01)
*B65H 75/44* (2006.01)

(56) References Cited

U.S. PATENT DOCUMENTS

2011/0095116 A1   4/2011   Hada et al.
2012/0111511 A1*  5/2012   Kitani .................. B60J 7/0015
                                                  160/370.22

FOREIGN PATENT DOCUMENTS

DE   102009035426 A1   2/2011
EP        0369080 A1   5/1990
JP        7293157 A    11/1995
JP       2014169595 A   9/2014

OTHER PUBLICATIONS

German Office Action issued in corresponding German Application No. 10 2021 203 516.7, date of mailing Nov. 15, 2021 (5 pages).

\* cited by examiner

WINDING ASSEMBLY AND METHOD FOR PRODUCING SUCH A WINDING ASSEMBLY

CROSS-REFERENCE TO RELATED APPLICATION

This claims priority from German Application No. 10 2021 203 516.7, filed Apr. 9, 2021, the disclosure of which is hereby incorporated by reference in its entirety.

TECHNICAL FIELD

The invention relates to a winding assembly for a protective device of a motor vehicle, comprising a form-stable winding shaft and a flexible winding web which is held on the winding shaft such that it can be wound up and unwound. The invention relates additionally to a method for producing such a winding assembly.

BACKGROUND AND SUMMARY

Such a winding assembly is known from DE 10 204 331 A1, for example, and is provided for a protective device in the form of a side window roller blind of a motor vehicle. The known winding assembly comprises a tubular winding shaft and a flexible winding web which is held on the winding shaft such that it can be wound up and unwound. In order to produce the winding assembly, the winding shaft is composed of two channel-like elements. The flexible winding web is secured by an edge to an outer surface of the winding shaft.

The object of the invention is to provide a winding assembly and a method of the type mentioned at the beginning which offer advantages over the prior art and in particular permit a simplified construction and simplified production.

The method according to the invention comprises the steps: winding up a first portion of a flexible sheet-form material; carrying out form stabilization of the wound-up first portion, wherein the form-stable winding shaft is formed by the form-stabilized wound-up first portion of the flexible sheet-form material, and wherein the flexible winding web is formed by a second portion of the flexible sheet-form material adjoining the first portion, whereby the winding shaft and the winding web are in continuous one-piece form. As a result of the solution according to the invention it is possible in particular to dispense with separate securing of the winding web to the winding shaft. This simplifies production, wherein it is possible in particular to dispense with corresponding joints between the winding shaft and the winding web. A simplified construction and a comparatively lower weight of the winding assembly can thus be achieved. This brings with it further advantages in terms of mounting in the motor vehicle, on the one hand, and in terms of logistics processes upstream of mounting, on the other hand. The first portion and the second portion of the flexible sheet-form material are portions of the same cut piece of the flexible sheet-form material. The first portion is preferably wound up on a winding core. Alternatively, the first portion is rolled up at the edge and rolled up on itself as it were. Form stabilization of the first portion can be carried out in the broadest sense by frictional engagement, interlocking engagement and/or substance-to-substance bonding. Form stabilization can comprise a plurality of steps, wherein one step is performed before the first portion is wound up and a further step is performed after the first portion has been wound up, for example. Alternatively or additionally, a further step of form stabilization can be performed during winding up. The flexible sheet-form material is preferably a textile sheet-form material, for example a woven fabric, a knitted fabric, a nonwoven or a felt. The flexible sheet-form material is preferably produced from a plastics material. Preference is given to production from a thermoplastic plastics material, particularly preferably from polyethersulfone, which is commonly known by the abbreviation PES.

In an embodiment of the invention, form stabilization comprises joining together winding layers of the wound-up first portion lying one on top of the other by substance-to-substance bonding. Joining by substance-to-substance bonding is particularly easy to implement from the point of view of production. This is the case in particular in comparison with form stabilization of the wound-up first portion by frictional and/or interlocking engagement, which is conceivable in principle, such as, for example, by means of stitching of the winding layers lying one on top of the other. The winding layers lying one on top of the other can be joined together by substance-to-substance bonding without the use of an additional substance if the flexible sheet-form material has corresponding properties and, for example, is liquefiable under the action of heat and/or pressure. Alternatively, the winding layers lying one on top of the other can be joined together using an additional substance, for example an adhesive, a solvent or the like. Joining by substance-to-substance bonding is preferably carried out over a large surface area, in particular over the entire surface area. Alternatively or additionally, point- and/or line-wise joining together can be carried out.

In a further embodiment of the invention, form stabilization comprises adhesively bonding, welding and/or fusing together winding layers of the wound-up first portion lying one on top of the other. Adhesive bonding preferably comprises applying an adhesive, a solvent or the like to the first portion. Application can take place in the non-wound and/or wound-up state of the first portion. If an adhesive is applied, adhesive bonding comprises curing the adhesive in the wound-up state of the first portion. If a solvent is applied, adhesive bonding comprises dissolving a surface of the first portion and curing and/or setting to form an adhesive bond between the winding layers lying one on top of the other. If welding is carried out, the flexible sheet-form material is preferably produced from a weldable material, in particular from a thermoplastic plastics material. Welding can be carried out in a point- and/or line-like manner. Welding can be carried out by means of friction welding, in particular by means of ultrasonic welding. If fusion is carried out, the flexible sheet-form material is preferably produced from a thermoplastic plastics material.

In a further embodiment of the invention, form stabilization comprises pressing the wound-up first portion. Pressing serves the purpose of improved shaping of the wound-up first portion and allows the winding shaft to be formed such that it respects tolerances. Pressing can comprise inserting the wound-up first portion into a pressing mold which has a corresponding negative form. Pressing can be carried out under the influence of heat and/or radiation.

In a further embodiment of the invention, form stabilization comprises applying a polymerizable substrate to the first portion and curing the wound-up first portion provided with the polymerizable substrate. The inventors have recognized that this embodiment of the invention offers particular advantages and in particular permits further simplified production. The polymerizable substrate is applied to the first portion preferably in liquid, viscous and/or pasty form. This can take place before and/or after winding up. Preferably, the polymerizable substrate is applied in liquid form to the wound-up first portion, wherein the first portion is impregnated with the polymerizable substrate. On curing of the first portion, polymerization of the substrate takes place. In this process—to put it simply—a plastics material is synthesized. Since the polymerizable substrate has been applied to the first portion, the first portion is stabilized in its wound-up form as a result of the polymerization. In other words, this can also be referred to as hardening or stiffening. Within the meaning of this invention, the term "polymerization" includes in particular polymerization, polyaddition and polycondensation reactions.

In a further embodiment of the invention, curing comprises exposing the wound-up first portion provided with the polymerizable substrate to light, in particular to UV light. The time required for curing can thus be reduced and further simplified production can be achieved. In addition, curing can take place particularly evenly. This offers advantages in terms of the achievable mechanical properties of the winding shaft.

In a further embodiment of the invention, the method comprises the step: cutting the flexible sheet-form material, wherein the first portion is cut to form a first basic shape which has non-parallel sides, in particular is trapezoidal, and/or wherein the second portion is cut to form a second basic shape which has non-parallel sides, in particular is trapezoidal. As a result of the non-parallel sides of the first portion, a conical winding shaft can in particular be formed. This in particular allows the flexible winding web to be wound up and unwound in a direction oriented non-orthogonal to an axis of rotation of the winding shaft. In the prior art, conical winding shafts are comparatively complex to form, since conical winding shafts cannot be extruded, for example. The invention offers particular advantages in this context. As a result of the non-parallel sides of the second portion, the unwound shape of the flexible winding web can be adapted particularly easily to a geometry to be covered and/or separated in a vehicle, for example to a vehicle window, a luggage compartment opening or the like. By means of this embodiment of the invention, the geometric properties of the winding shaft and of the winding web can be adapted to a wide variety of installation situations in a vehicle by simply adapting the cut piece of the flexible sheet-form material. This allows a significant simplification and flexibilization of the manufacture and construction of the winding assembly.

In a further embodiment of the invention, the first portion is wound onto a cylindrical winding core, wherein the winding core is removed from the winding shaft after form stabilization. A tubular winding shaft can thus be formed particularly easily. By winding on the cylindrical winding core, a particularly dimensionally stable inner contour of the winding shaft can be achieved. This is advantageous in particular with regard to the fitting of further components of the winding assembly into the winding shaft. The winding core is preferably produced from an elastomeric material, in particular silicone. This in particular allows the winding core to be removed easily and reliably after form stabilization of the winding shaft. If the winding core is produced from silicone, it can additionally serve as a light guide for exposing the wound-up first portion to light for the purpose of curing. This is particularly advantageous.

The winding assembly according to the invention provides that the winding shaft is formed by a form-stabilized wound-up first portion of a flexible sheet-form material and that the flexible winding web is formed by a second portion of the flexible sheet-form material adjoining the first portion, whereby the winding shaft and the winding web are in continuous one-piece form. With regard to advantages associated with the solution according to the invention, reference is made to the preceding description of the method according to the invention. The remarks made there correspondingly apply in an analogous manner also to the winding assembly according to the invention. Advantageous embodiments of the winding assembly according to the invention follow in an analogous manner from the features of the embodiments of the method according to the invention.

The invention relates additionally to a protective device for a motor vehicle having a winding assembly according to the preceding description. The protective device is preferably provided for an interior of the motor vehicle. The protective device is preferably a shading device or a separating device. The shading device can be adapted to shade a side window opening, a rear window opening or a roof opening of the motor vehicle. The separating device can be adapted to separate and/or cover a luggage compartment of the motor vehicle.

Further advantages and features of the invention follow from the claims and from the following description of a preferred exemplary embodiment of the invention, which is illustrated by means of the drawings.

DETAILED DESCRIPTION

Figure 1:
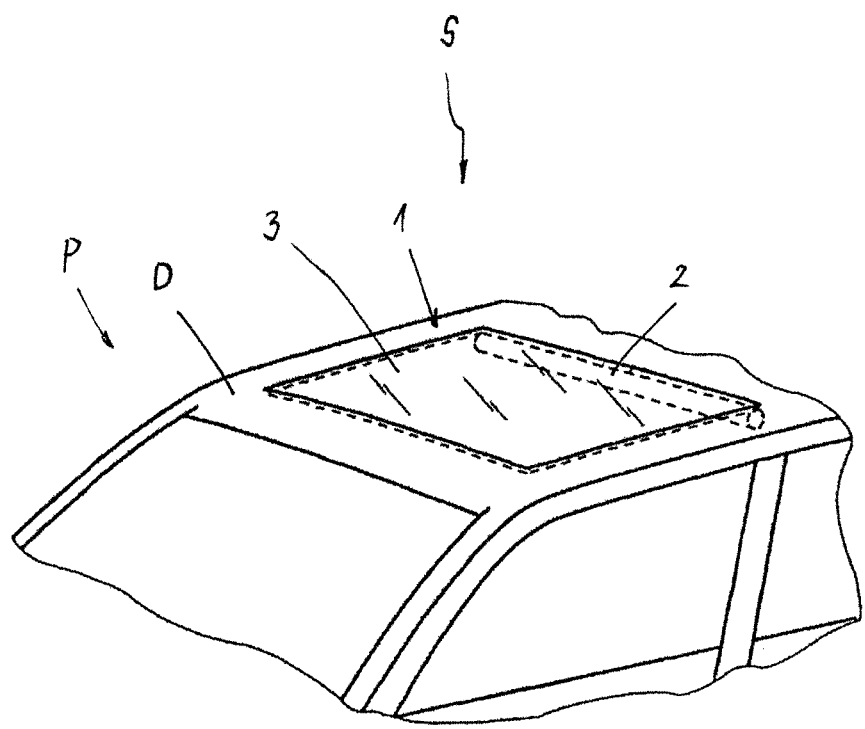
FIG. 1 shows, in a schematic perspective view, an embodiment of a protective device according to the invention for a motor vehicle which is provided with an embodiment of a winding assembly according to the invention.

According to FIG. 1, a protective device S is provided for shading a roof opening, not designated specifically, arranged in a roof region D of a passenger car P. The protective device S can in this respect also be referred to as a shading device. In embodiments not shown in the drawings, the shading device is adapted to shade a side window opening or a rear window opening of the passenger car P. In further embodiments which are not shown, the protective device can be configured as a luggage compartment cover or luggage compartment separating net of the passenger car P.

The protective device S comprises a winding assembly 1 having a form-stable winding shaft 2 and a flexible winding web 3 which is held on the winding shaft 2 such that it can be wound up and unwound. In the present case, the winding shaft 2 is rotatably mounted, secured to the vehicle, about an axis of rotation oriented parallel to a vehicle transverse axis. In the embodiment shown, the winding shaft 2 is arranged in the region of a rear edge, not designated specifically, of the roof opening. The winding web 3 can be wound up and unwound by rotating the winding shaft 2 and in this way is displaceable between a protecting position and an uncovering position. The protecting position can in the present case also be referred to as a shading position and is shown by means of FIG. 1. In the shading position, the unwound winding web 3 covers the roof opening so that the interior of the passenger car P is thus shaded. In the uncovering position, the winding web 3 is wound on the winding shaft 2.

Figure 2:
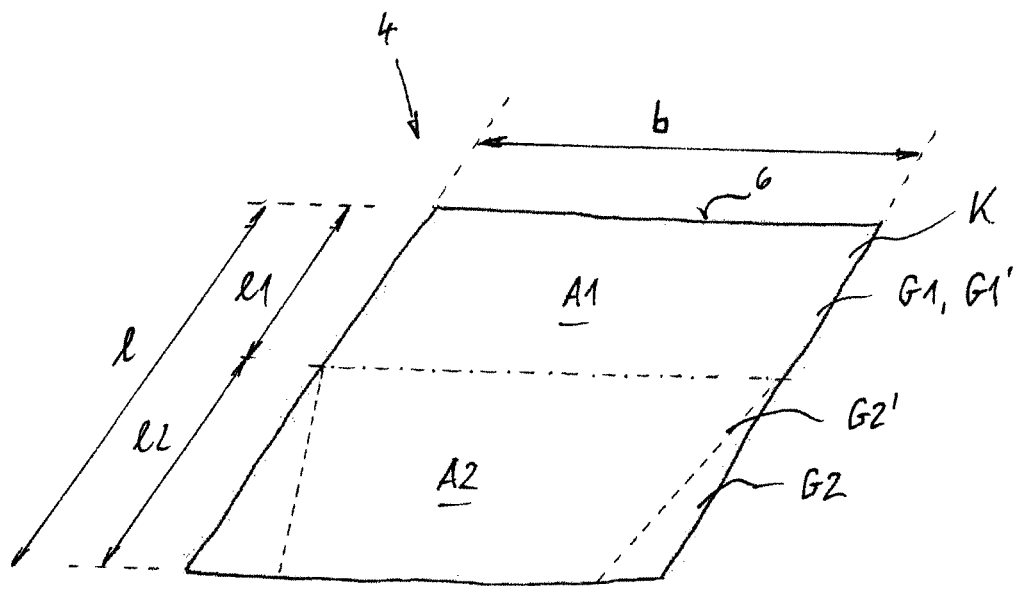
FIGS. 2 to 5 show schematically simplified diagrams illustrating an embodiment of a method according to the invention for producing the winding assembly according to FIG. 1.

In order to achieve particularly simple production and a particularly simple construction of the winding assembly 1, the winding shaft 2 is formed by a form-stabilized wound-up first portion A1 of a flexible sheet-form material 4 (see in particular FIG. 2, 6). The flexible winding web 3 is formed by a second portion A2 of the flexible sheet-form material 4 adjoining the first portion A1. The winding shaft 2 and the winding web 3 are thus in continuous one-piece form. With reference to FIG. 2, the first and second portions A1, A2 are depicted as being separated from one another by means of a dot-and-dash line. It will be appreciated that the first and second portions are nevertheless continuous in one piece.

A method for producing the winding assembly 1 comprises a plurality of steps illustrated by means of FIGS. 2 to 5 and 7:

In the present case, cutting Z of the flexible sheet-form material 4 is first carried out. Cutting Z can be carried out, for example, starting from rolled or piece goods. Alternatively, the flexible sheet-form material 4 can be acquired in already prefabricated form, so that cutting Z is not necessarily required. In this respect, the step of cutting Z is advantageous but not essential with regard to the solution according to the invention.

The (cut) flexible sheet-form material 4 shown in FIG. 2 is tailored in terms of its dimensions and with regard to its basic shape to the geometric properties of the winding shaft 2 on the one hand and of the winding web 3 on the other hand that are to be achieved or produced.

In the embodiment shown, the flexible sheet-form material 4 with its two portions A1, A2 has a rectangular basic shape with a width b and a length 1. The width b of the flexible sheet-form material 4 is tailored to a length, not designated specifically, of the winding shaft 2 along its longitudinal axis L (FIG. 6) that is to be achieved. The length 1 of the flexible sheet-form material 4 comprises a first length 11 of the first portion A1 and a second length 12 of the second portion A2. The first length 11 is tailored to a diameter of the winding shaft 2 that is to be produced. The second length 12 is tailored to a length of the flexible winding web 3 in the unwound state that is to be produced.

In the embodiment shown, the first portion A1 has a first basic shape G1. The second portion A2 has a second basic shape G2. The first and second basic shapes G1, G2 are each configured or cut in a rectangular shape in the embodiment shown.

Alternatively, the two portions A1, A2 can each be cut to form a non-parallel, in particular trapezoidal, basic shape. This is illustrated by means of the alternative second basic shape G2' depicted by a broken line. By correspondingly cutting the second portion A2, the winding web can easily be adapted on the production side to different installation situations in a motor vehicle with different geometries to be covered and/or separated. By cutting the first portion A1 in a non-parallel manner, a conical winding shaft can easily be formed. The reference numeral G1' is also to be understood in this context.

Figure 3:
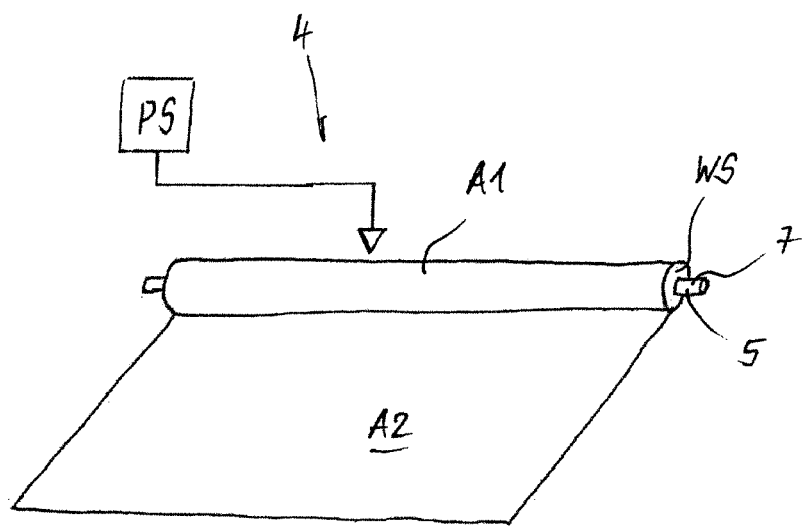
Figure 6:
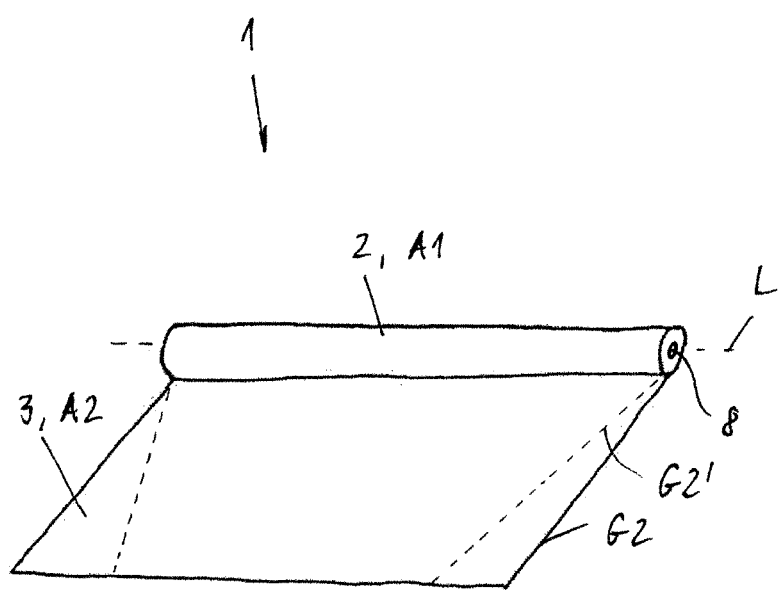
FIG. 6 shows, in a schematic perspective view, the winding assembly produced by means of the method according to FIGS. 2 to 5.
Figure 7:
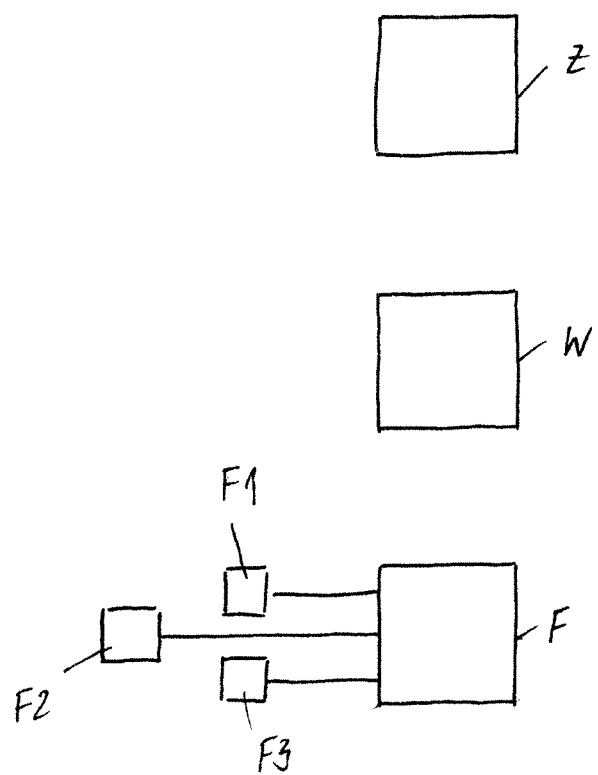
FIG. 7 shows a further schematic diagram illustrating the production method.

After cutting Z, winding up W (FIG. 7) of the first portion A1 is carried out. After winding up W, the flexible sheet-form material 4 assumes a configuration which is illustrated schematically by means of FIG. 3. In the embodiment shown, the first portion A1 is wound onto a cylindrical winding core 5. The winding core 5 is longer than the width b of the flexible sheet-form material 4. In the embodiment shown, the winding core 5 is oriented parallel to a rear edge 6 of the flexible sheet-form material 4 for winding the first portion A1. This is not absolutely essential, however. "Slanted" winding is also conceivable in principle. An outer contour 7 of the winding core 5 defines an inner contour 8 of the winding shaft 2 to be formed (FIG. 6). In the present case, the winding shaft 2 is accordingly in tubular form with a cylindrical inner contour for accommodating any further components of the winding assembly 1, for example a spring motor or the like. The second portion A2 is not wound up in order to form the winding shaft 2 and the winding web 3. In the wound-up state of the first portion A1, the first portion forms a plurality of winding layers WS lying one on top of the other (FIG. 3). The number of winding layers WS is tailored to the diameter of the winding shaft 2 that is to be achieved and is additionally governed by the thickness, not designated specifically, of the flexible sheet-form material 4.

In the embodiment shown, the flexible sheet-form material 4 is a knitted fabric produced from a plastics material K. The plastics material K is in the present case polyester (PES).

In order to form the cylindrical shaft 2, the first portion A1 is stabilized in its wound-up form. In other words, form stabilization F (FIG. 7) of the wound-up first portion A1 (FIG. 3) is carried out. Form stabilization can in principle be carried out by interlocking engagement, frictional engagement and/or substance-to-substance bonding. In the embodiment shown, substance-to-substance joining of the winding layers WS of the wound-up first portion A1 lying one on top of the other is provided for this purpose.

In further embodiments, adhesive bonding, welding and/or fusion, for example, of the winding layers WS lying one on top of the other is provided.

In the embodiment shown, form stabilization F comprises a plurality of steps:

In a step F1, a polymerizable substrate PS is applied to the first portion A1. Various methods and various substrates are conceivable for this purpose. In the present case, the first portion A1 is impregnated with the polymerizable substrate PS in the wound-up state. Accordingly, the substrate PS is in flowable, preferably liquid, form. The polymerizable substrate is in the present case UV-curing epoxy resins.

Figure 4:
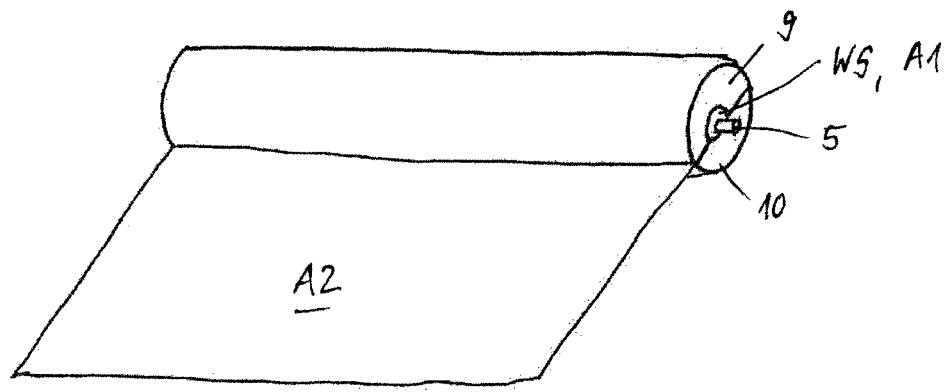

In a further step F2, the wound-up portion A1 impregnated with the substrate PS is pressed (FIG. 4). Pressing F2 is carried out in the present case by means of a jaw-type mold 9, 10 having an upper molding jaw 9 and a lower molding jaw 10. By pressing F2 by means of the jaw-type mold 9, 10, improved shaping of the wound-up first portion A1 and thus improved dimensional stability of the winding shaft 2 to be produced can be achieved. The jaw-type mold 9, 10 accordingly has an inner contour, not shown in detail, which forms a negative mold to the outer contour of the winding shaft 2 that is to be achieved. Pressing F2 can be carried out under the action of heat and/or radiation.

Figure 5:
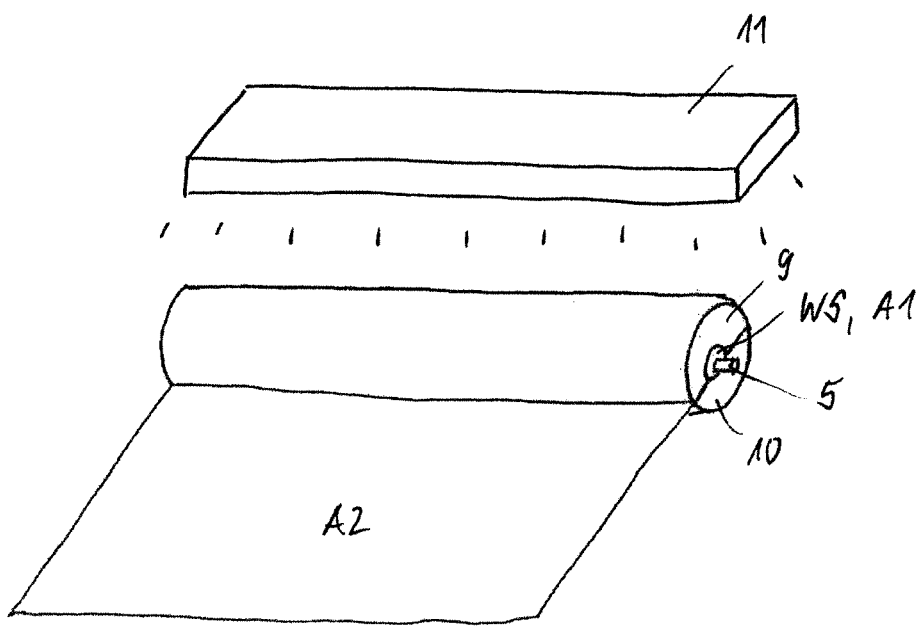

In a further step F3, curing of the wound-up first portion A1 provided with the polymerizable substrate PS is carried out. Curing F3 is shown schematically by means of FIG. 5 and in the present case is carried out by exposing the wound-up first portion A1 impregnated with the substrate PS to light. Exposure to light is carried out by means of a light source 11, shown schematically and in a greatly simplified manner, which in the present case is a UV light source. It will be appreciated that curing F3 can be carried out after and/or during pressing F2. In order to illustrate curing F3 during pressing F2, the wound-up first portion shown in FIG. 5 is still accommodated in the jaw-type mold 9, 10 during curing. Accordingly, the light source 11 can be integrated in the jaw-type mold 9, 10, for example. Alternatively, curing F3 can be carried out after the first portion A1 has been removed from the jaw-type mold 9, 10.

During curing, a chemical reaction of the substrate PS takes place, by means of which the first portion A1 is stabilized in its wound-up form to form the winding shaft 2 (FIG. 6). In this context, stabilization can also be referred to as fixing, stiffening and/or hardening.

After curing F3 and removal from the jaw-type mold 9, 10, the winding core 5 is removed from the winding shaft 2. The winding core 5 is in the present case produced from a silicone material. This ensures that it can be removed easily and reliably. The winding core 5 produced from the silicone material additionally serves in the present case as a light guide for exposing to light or curing the polymerizable substrate PS. That is to say, the wound-up first portion A1 is exposed to light from within via the winding core 5.

The invention claimed is:

1. A method for producing a winding assembly for a protective device of a motor vehicle having a form-stable winding shaft and a flexible winding web held on the winding shaft such that the winding web can be wound up on the winding shaft and unwound from the winding shaft, the method comprising the following steps:
   winding up a first portion of a flexible sheet-form material to form a plurality of winding layers;
   carrying out form stabilization of the wound-up first portion to fix the winding layers to one another and maintain the winding layers in wound form, thereby forming the form-stable winding shaft with the form-stabilized wound-up first portion of the flexible sheet-form material; and
   forming the flexible winding web with a second portion of the flexible sheet-form material adjoined to the first portion,
   whereby the winding shaft and the flexible winding web are in a continuous one-piece form.

2. The method as claimed in claim 1, wherein the step of carrying out form stabilization comprises joining together the winding layers of the wound-up first portion so that the winding layers are fixed one on top of the other by substance-to-substance bonding.

3. The method as claimed in claim 1, wherein the step of carrying out form stabilization comprises adhesively bonding, welding and/or fusing together the winding layers of the wound-up first portion so that the winding layers are fixed one on top of the other.

4. The method as claimed in claim 1, wherein the step of carrying out form stabilization comprises pressing the wound-up first portion so that the winding layers are fixed one on top of the other.

5. The method as claimed in claim 1, wherein the step of carrying out form stabilization comprises applying a polymerizable substrate to the first portion and curing the wound-up first portion provided with the polymerizable substrate so that the winding layers are fixed one on top of the other.

6. The method as claimed in claim 5, wherein the curing comprises exposing the wound-up first portion provided with the polymerizable substrate to light.

7. The method as claimed in claim 1, comprising the step of cutting the flexible sheet-form material, including cutting the first portion to form a first basic shape having non-parallel sides, and/or cutting the second portion to form a second basic shape having non-parallel sides.

8. The method as claimed in claim 1, further comprising winding the first portion onto a cylindrical winding core, and removing the winding core from the winding shaft after the step of carrying out form stabilization.

9. The method as claimed in claim 5, wherein the curing comprises exposing the wound-up first portion provided with the polymerizable substrate to UV light.

10. The method as claimed in claim 7, wherein the first and second basic shapes are trapezoidal.

11. A winding assembly for a protective device produced by the method as claimed in claim 1.

12. A method for producing a winding assembly for a protective device for use in a motor vehicle, the method comprising:
   providing a sheet of continuous flexible material having first and second portions;
   winding up the first portion of the continuous flexible material to form a wound-up first portion including a plurality of winding layers;
   stabilizing the plurality of winding layers of the wound-up first portion to fix the winding layers to one another and form a form-stable winding shaft; and
   forming a flexible winding web from the second portion of the continuous flexible material which remains after the step of winding up the first portion and producing a winding assembly having the form-stable winding shaft and the flexible winding web in a continuous one-piece form.

13. The method as claimed in claim 1, wherein the step of forming the flexible winding web with the second portion of the flexible sheet-form material comprises forming the flexible winding web from the second portion of the flexible sheet-form material which remains after the step of winding up the first portion.

* * * * *